US009796443B2

United States Patent
Eckert

(10) Patent No.: US 9,796,443 B2
(45) Date of Patent: Oct. 24, 2017

(54) CONVERSION SCOOTER

(71) Applicant: RADIO FLYER INC., Chicago, IL (US)

(72) Inventor: Cameron Eckert, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 15/287,374

(22) Filed: Oct. 6, 2016

(65) Prior Publication Data

US 2017/0101153 A1 Apr. 13, 2017

Related U.S. Application Data

(60) Provisional application No. 62/239,049, filed on Oct. 8, 2015.

(51) Int. Cl.
| | |
|---|---|
| *B62K 13/08* | (2006.01) |
| *B62K 9/00* | (2006.01) |
| *B62J 1/08* | (2006.01) |
| *B62K 3/00* | (2006.01) |
| *B62K 21/00* | (2006.01) |

(52) U.S. Cl.
CPC .............. *B62K 13/08* (2013.01); *B62J 1/08* (2013.01); *B62K 3/002* (2013.01); *B62K 9/00* (2013.01); *B62K 21/00* (2013.01)

(58) Field of Classification Search
CPC .......... B62K 13/00; B62K 13/08; B62K 9/00; B62K 3/002; B62K 21/00; B62J 1/08
USPC .................................... 280/7.1, 7.15
See application file for complete search history.

(56) References Cited

U.S. PATENT DOCUMENTS

| | | | |
|---|---|---|---|
| 1,379,305 A | * | 5/1921 | Johns .................. B62K 9/02 280/7.1 |
| 6,089,586 A | | 7/2000 | Rudell et al. |
| D571,861 S | | 6/2008 | On |
| D571,863 S | | 6/2008 | On |
| 7,487,982 B2 | | 2/2009 | Chan |
| D631,102 S | | 1/2011 | Jessie, Jr. |

(Continued)

FOREIGN PATENT DOCUMENTS

| | | |
|---|---|---|
| CN | 201980349 | 9/2011 |
| CN | 102267519 | 12/2011 |

(Continued)

OTHER PUBLICATIONS

International Search Report for related International Patent Application No. PCT/US2015/055904 dated Jan. 26, 2017.

*Primary Examiner* — John Walters
(74) *Attorney, Agent, or Firm* — McDermott Will & Emery LLP

(57) ABSTRACT

A conversion scooter is provided that converts from a stand-up mode to a sit-down mode. The conversion scooter has a frame, a seat, a steering assembly at the forward portion of the frame, and a rear wheel coupled to the rear portion of the frame. The seat has a first coupling member at the first end of the seat and the second end of the seat, and a second coupling member at the first end of the seat and the second end of the seat. The frame has a receiver at the forward portion of the frame to secure the first coupling member of the seat to the forward portion of the frame, and a locking assembly at the rear portion of the frame to secure the seat to the rear portion of the frame.

18 Claims, 8 Drawing Sheets

(56) References Cited

U.S. PATENT DOCUMENTS

| | | | |
|---|---|---|---|
| 8,500,134 B2 * | 8/2013 | Tzoreff | B62K 3/002 |
| | | | 280/282 |
| 8,517,403 B2 | 8/2013 | Jessie, Jr. | |
| 8,523,193 B1 | 9/2013 | Mucaro | |
| D710,949 S | 8/2014 | Huang | |
| 9,010,780 B1 | 4/2015 | Chiu | |
| 9,016,702 B2 | 4/2015 | Huang | |
| 9,022,406 B2 | 5/2015 | Ouboter | |
| 9,114,821 B1 | 8/2015 | Xu | |
| D745,608 S | 12/2015 | Xu | |
| 9,233,728 B2 | 1/2016 | Mucaro | |
| D749,174 S | 2/2016 | O'Connell | |
| 9,545,969 B2 * | 1/2017 | Byrne | B62K 13/00 |
| 2002/0000702 A1 | 1/2002 | Charron | |
| 2005/0206114 A1 | 9/2005 | Michelau | |
| 2010/0148460 A1 | 6/2010 | Nelson | |
| 2011/0198819 A1 | 8/2011 | Jessie, Jr. | |
| 2012/0181773 A1 | 7/2012 | Ouboter | |
| 2013/0082451 A1 * | 4/2013 | Lin | B62K 3/002 |
| | | | 280/87.021 |
| 2014/0217685 A1 | 8/2014 | Byrne et al. | |
| 2015/0097346 A1 | 4/2015 | Mucaro | |

FOREIGN PATENT DOCUMENTS

| | | |
|---|---|---|
| CN | 202271828 | 6/2012 |
| CN | 202754075 | 2/2013 |
| CN | 203511908 | 4/2014 |
| CN | 203567873 | 4/2014 |
| CN | 203975081 | 12/2014 |
| CN | 204056139 | 12/2014 |
| CN | 204197150 | 3/2015 |
| CN | 204415620 | 6/2015 |
| KR | 2013-0002375 | 4/2013 |

* cited by examiner

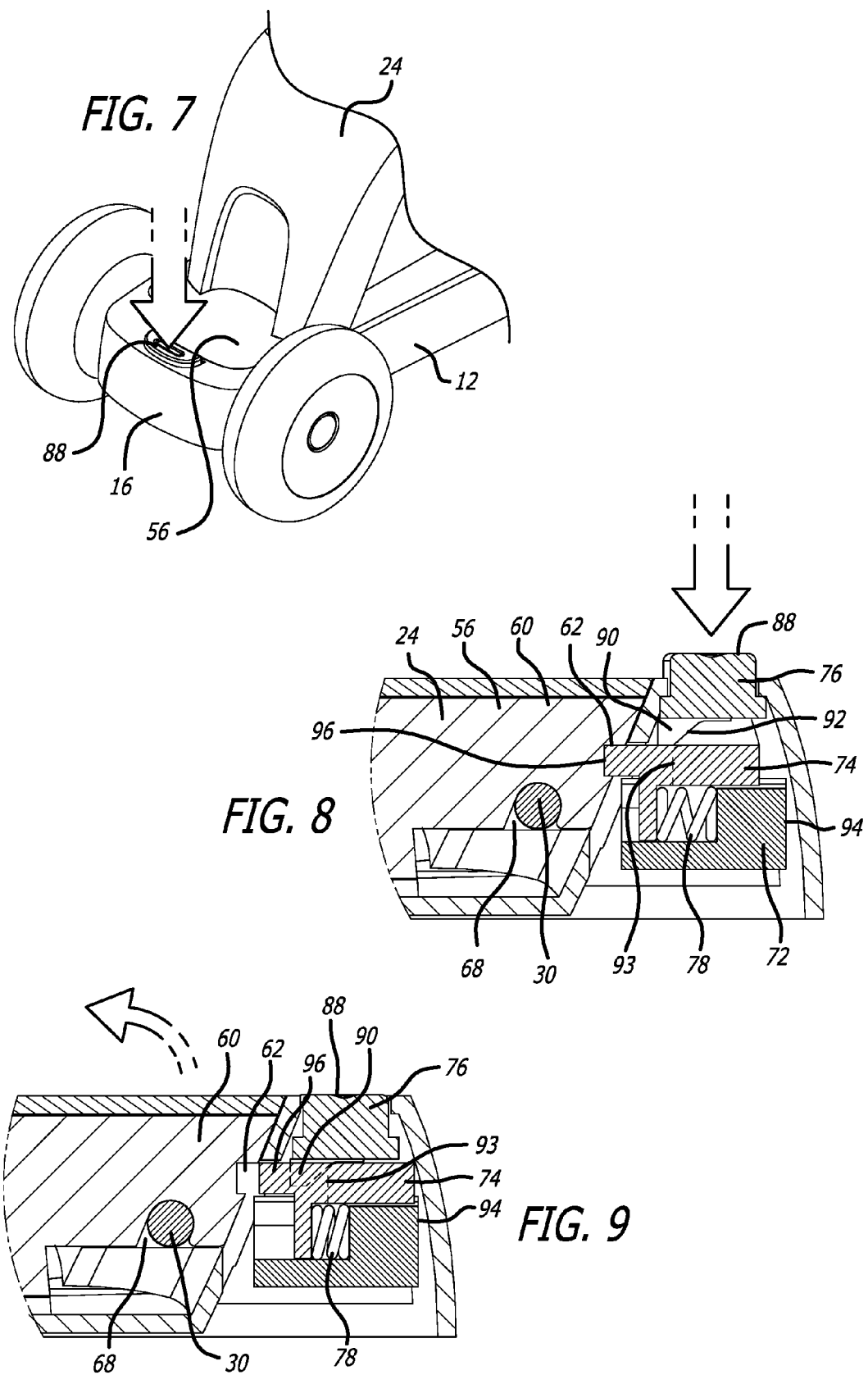

CONVERSION SCOOTER

CROSS-REFERENCE TO RELATED APPLICATIONS

This application claims the benefit of U.S. Provisional Patent Application No. 62/239,049, filed Oct. 8, 2015, which is expressly incorporated herein by reference and made a part hereof.

FEDERALLY SPONSORED RESEARCH OR DEVELOPMENT

Not Applicable.

TECHNICAL FIELD

The present disclosure generally relates to a conversion scooter. In particular, a scooter is provided that may be converted between a seated riding configuration and a standing riding configuration.

BACKGROUND

Scooters that provide a seat for seated riding and scooters that provide a foot platform for stand up riding are known. Scooters with a seat may be used for younger children or children with less developed balance to ride on while sitting down. Other scooters have a foot platform or deck instead of a seat and may be used for older children or children with more developed balance to ride on while standing up. If a child outgrows the seated scooter or becomes more coordinated in balance, a standing scooter may be utilized. Similarly, if a child who typically rides a standing scooter does not want to stand up, or is unable to ride in the standing position (e.g., the child has a leg injury), then a seated scooter may be obtained. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a conversion scooter that converts from a stand-up mode to a sit-down mode. The conversion scooter has a frame, a removable seat, a steering assembly at the forward portion of the frame, and a rear wheel coupled to the rear portion of the frame.

The disclosed subject technology further relates to a conversion scooter that converts from a stand-up mode to a sit-down mode, comprising: a frame having a forward portion and a rear portion; a steering assembly connected to the frame at the forward portion of the frame; at least one front wheel connected to the steering assembly; at least one rear wheel operatively coupled to the rear portion of the frame; a seat having a first end and a second end, a first coupling member at the first end of the seat and the second end of the seat, a second coupling member at the first end of the seat and the second end of the seat; a receiver at the forward portion of the frame, the receiver adapted to secure the first coupling member of the seat to the forward portion of the frame; and, a locking assembly at the rear portion of the frame, the locking assembly having a tab that releasably engages the second coupling member of the seat to secure the seat to the frame.

The disclosed subject technology further relates to a conversion scooter that converts from a stand-up mode to a sit-down mode, comprising: a frame having a forward portion and a rear portion; a steering assembly connected to the frame at the forward portion of the frame; at least one front wheel connected to the steering assembly; a rear axle coupled to the rear portion of the frame; at least one rear wheel coupled to the rear axle; a seat having an L-shape, the seat having a first end and a second end, a first coupling member at the first end of the seat and the second end of the seat, a second coupling member at the first end of the seat and the second end of the seat, wherein the first coupling member comprises a protrusion extending from the first end of the seat, wherein the second coupling member comprises an aperture in seat; a female receiver at the forward portion of the frame, the female receiver having a rib to removably engage the first coupling member; and, a locking assembly at the rear portion of the frame, the locking assembly comprising a release member having a cam, a slider member having a tab that releasably engages the second coupling member of the seat, and the slider member further having a cam follower that is selectively engaged by the cam on the push-button release member.

The disclosed subject technology further relates to a conversion scooter that converts from a stand-up mode to a sit-down mode, comprising: a frame having a forward portion and a rear portion; a steering assembly connected to the frame at the forward portion of the frame; at least one front wheel connected to the steering assembly; a rear axle coupled to the rear portion of the frame; at least one rear wheel coupled to the rear axle; a seat having an L-shape, the seat having a first end and a second end, a first coupling member at the first end of the seat and the second end of the seat, a second coupling member at the first end of the seat and the second end of the seat, wherein the first coupling member comprises a protrusion extending from the first end of the seat, wherein the second coupling member comprises an aperture in seat; a female receiver at the forward portion of the frame, the female receiver having a rib extending from an interior of the receiver to removably receive a groove in a portion of the protrusion of the first coupling member; and, a locking assembly at the rear portion of the frame, the locking assembly comprising a push-button release member having a cam, a slider member having a tab that releasably engages the second coupling member of the seat, the slider member further having a cam follower that is selectively engaged by the cam on the push-button release member, and a bracket that slidingly receives the sliding member.

The disclosed subject technology further relates to a frame having a cavity in a longitudinal portion of the frame to receive a portion of the seat when the conversion scooter is in the stand-up mode. In one embodiment, the portion of the seat in the cavity is used to stand on by the user.

The disclosed subject technology further relates to a frame having a receiver, where the receiver is a female receiver having a cavity, and a rib extends into the cavity to removably engage the first coupling member.

The disclosed subject technology further relates to a receiver that has an undercut adjacent the rib to accommodate an end of the protrusion.

The disclosed subject technology further relates to a seat having a first coupling member that comprises a protrusion extending from the seat, and a second coupling member that comprises an aperture in seat.

The disclosed subject technology further relates to a seat that has a groove in the protrusion extending from the first end to receive a rib extending from an interior of the receiver.

The disclosed subject technology further relates to a seat that has a groove in the protrusion at the second end, and wherein the groove receives the rear axle.

The disclosed subject technology further relates to a locking assembly that comprises a release member and a slider member. In one embodiment, the release member extends from the frame, and the slider member has a tab that releasably engages the second coupling member of the seat. In one embodiment, the release member has a cam extending therefrom, and the slider member has a cam follower that is selectively engaged by the cam on the release member. In one embodiment, the locking assembly also comprises a bracket. In one embodiment, the bracket slidingly receives the sliding member. In one embodiment the locking assembly also comprises a spring. The spring may be between the bracket and the slider member to bias the slider away from the bracket. In one embodiment, the release member is a push button release member. In one embodiment, the push-button release member moves in a first direction, and the slider member moves in a second direction transverse to the first direction.

The disclosed subject technology further relates to a conversion scooter that transitions between a sit-down mode and a stand-up mode. In one embodiment, in the sit-down mode the second end of the seat is locked to the frame with the locking assembly engaging the second end of the seat. In one embodiment, in the stand-up mode the first end of the seat is locked to the frame with the locking assembly engaging the first end of the seat.

The disclosed subject technology further relates to a conversion scooter that is configured to be converted between a sit-down mode and a stand-up mode without requiring the addition or subtraction of any parts.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

FIG. 7 is a partial view of the conversion scooter of FIG. 1.

FIG. 8 is a partial cross-sectional view of the locking mechanism from FIG. 6, with the locking mechanism in the locked position.

FIG. 9 is a partial cross-sectional view of the locking mechanism from FIG. 6, with the locking mechanism in the unlocked position.

DETAILED DESCRIPTION

Figure 1:
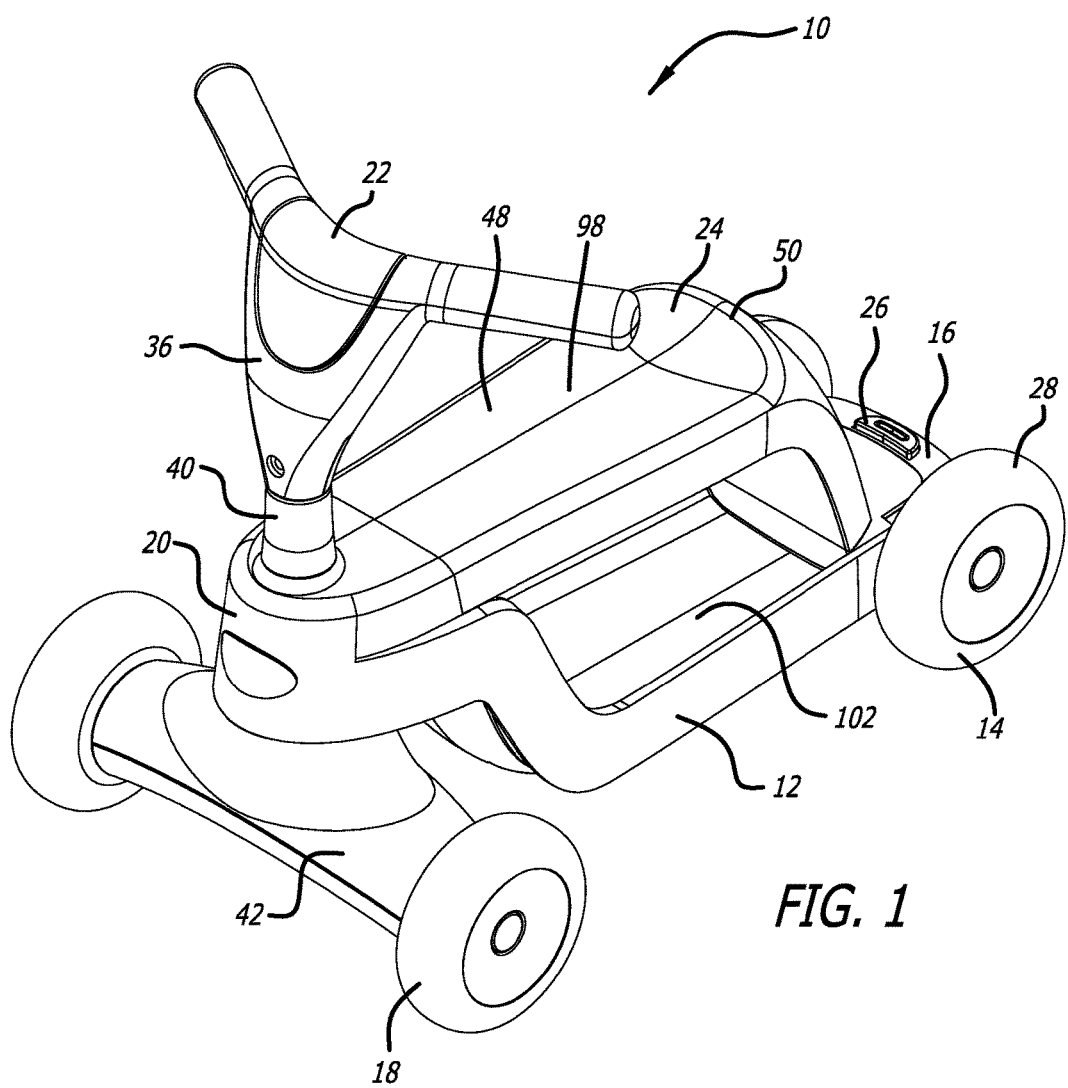
FIG. 1 is a front top perspective view of an embodiment of a conversion scooter in the sit to ride configuration.

While the conversion scooter discussed herein is susceptible of embodiments in many different forms, there is shown in the drawings, and will herein be described in detail, preferred embodiments with the understanding that the present description is to be considered as an exemplification of the principles of the conversion scooter and is not intended to limit the broad aspects of the disclosure to the embodiments illustrated.

The conversion scooter is a product that can be used by children from the infant stage through the toddler stage and into the adolescent stage and beyond. For example, the conversion scooter can operate as a sit down or sit-to-ride scooter having a seat for seated riding and with the handlebars in a lowered position (see FIG. 1). As the child grows or becomes more adept at balancing, the seat can be removed, inverted and reinstalled upside down on the foot platform of the housing, and the handlebars raised, thereby providing a stand up scooter (see FIG. 13). Conversely, if the child does not want to ride in the standing position or is not able to ride in the standing position (e.g., the child is injured) or if the child outgrows the scooter and the scooter is passed down to a younger child, the handlebars may be lowered, and the seat removed, inverted and reinstalled to cover the foot platform in the housing, thereby again providing a sit down scooter. Moreover, in each of these configurations all of the components of the scooter stay on the scooter, so there are no loose parts that need to be stored and/or located when the scooter is converted to the other configuration.

Figure 2:
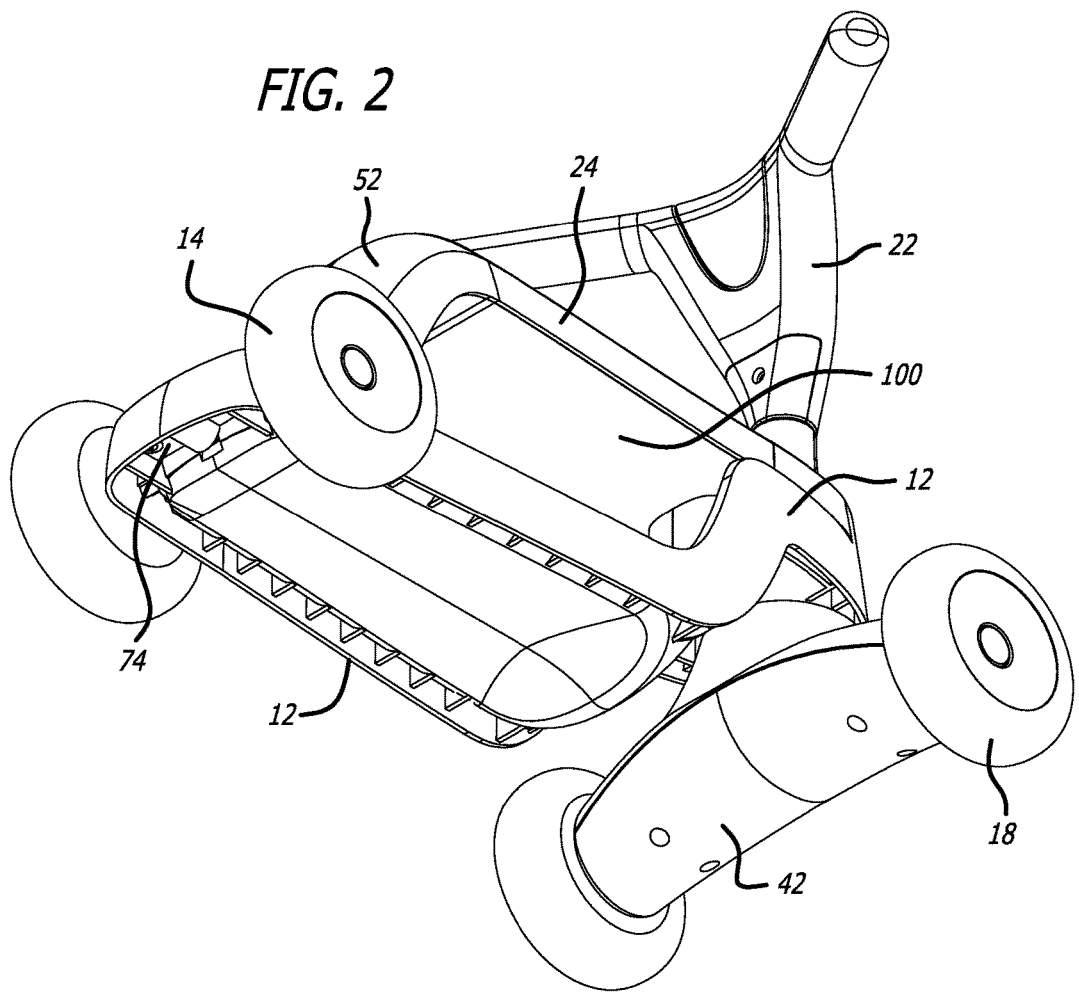
FIG. 2 is a bottom rear perspective view of the conversion scooter of FIG. 1.
Figure 3:
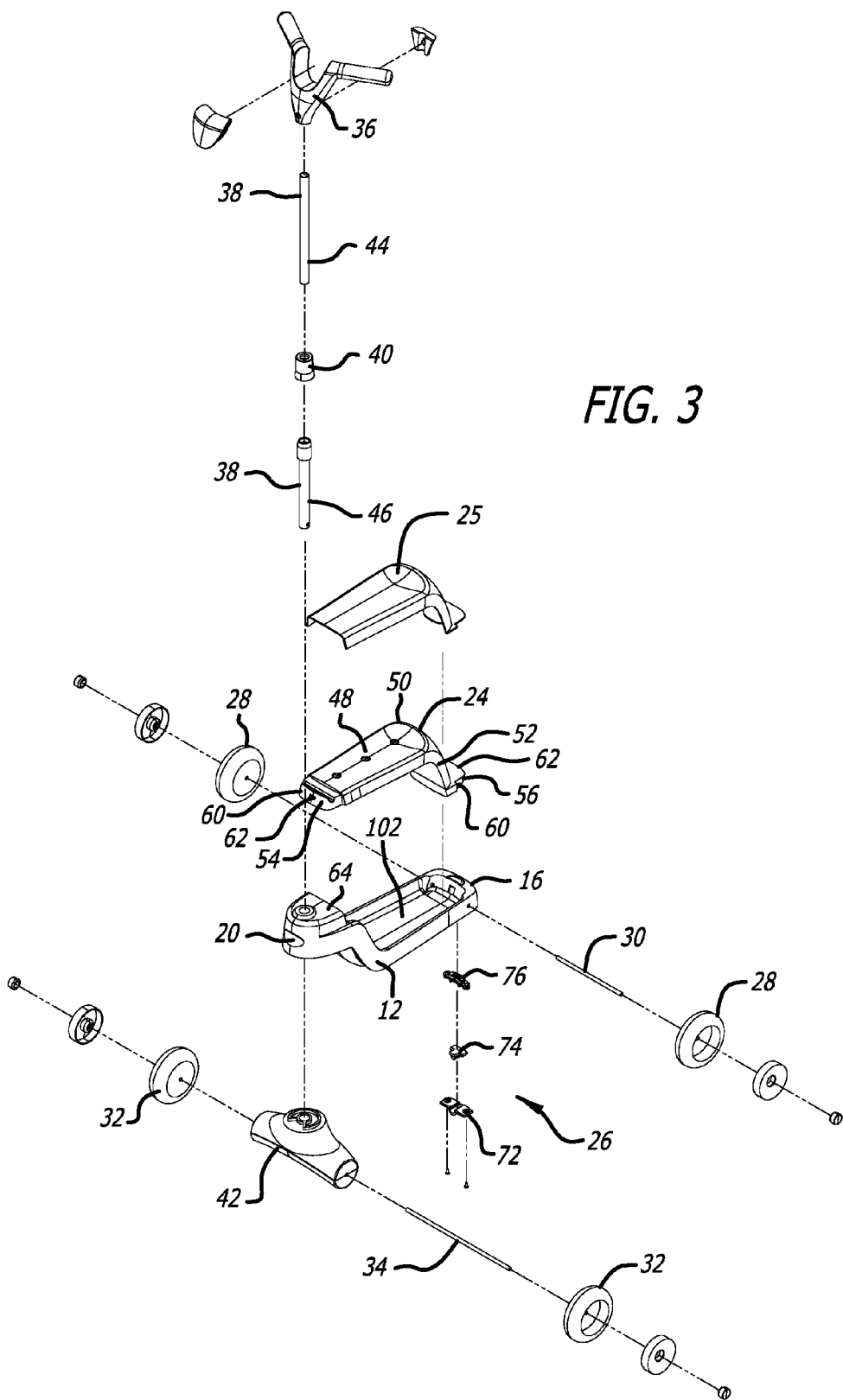
FIG. 3 is an exploded front perspective view of the conversion scooter of FIG. 1.
Figure 10:
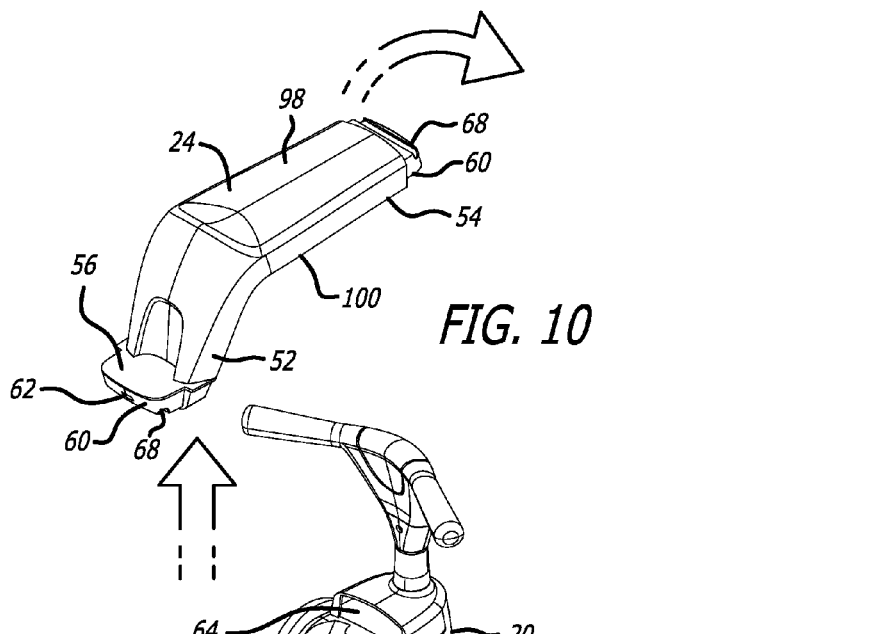
FIG. 10 is a rear perspective view of the conversion scooter being converted from the sit orientation to a stand orientation.
Figure 11:
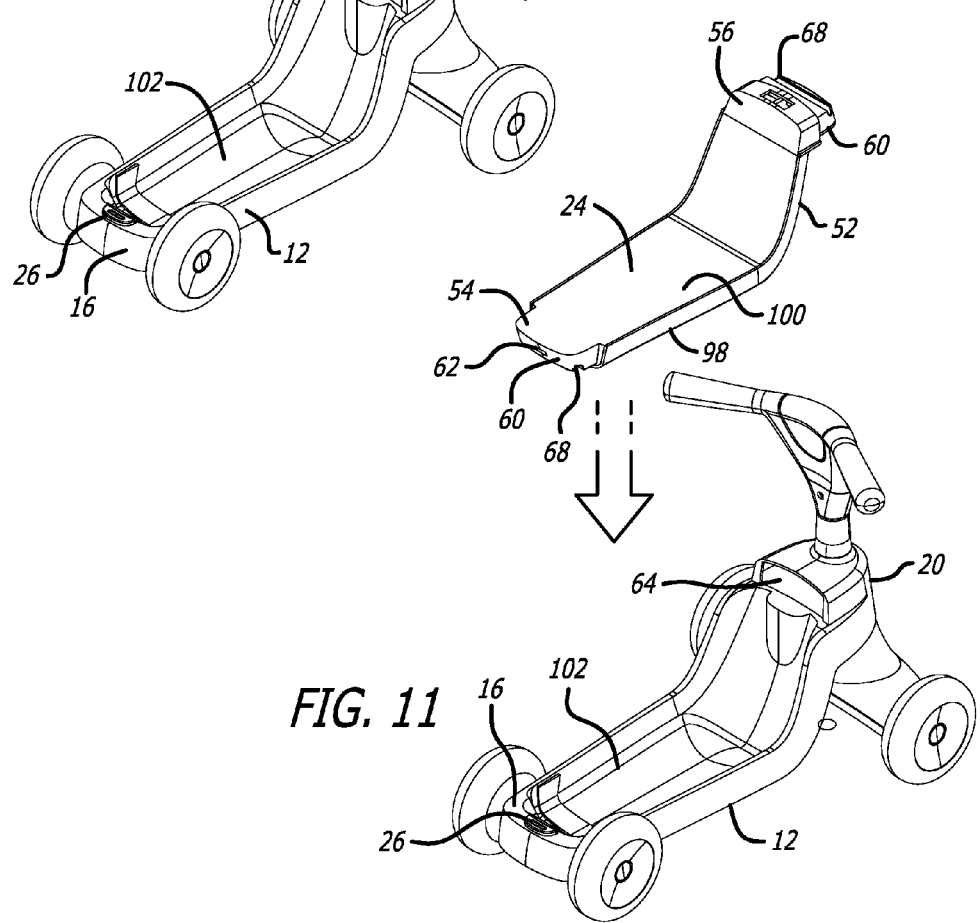
FIG. 11 is a rear perspective view of the conversion scooter being converted from the sit orientation to a stand orientation.

Referring now to the figures, and initially to FIGS. 1-3, in one embodiment the conversion scooter 10 includes a frame 12, a rear wheel assembly 14 supporting a rear portion 16 of the frame 12, a front wheel assembly 18 supporting a forward portion 20 of the frame 12, a steering assembly 22, a seat 24, and a locking assembly 26. The seat 24 can be removed, inverted and reinserted upside-down on the frame 12, as shown in FIGS. 10 and 11, to convert the conversion scooter 10 into the standup scooter orientation of FIGS. 12 and 13.

The rear wheel assembly 14 comprises a pair of rear wheels 28 rotatably supported at opposite ends of a rear axle 30 at the rear portion of the frame. Similarly, the front wheel assembly 18 includes a pair of front wheels 32 rotatably supported at opposite ends of a front axle 34. In the illustrated embodiment, the front axle 34 is coupled to the steering assembly 22 located at the forward portion of the frame such that rotation or turning of the steering assembly 22 rotates or turns the front axle 34 and front wheels 32. The steering assembly 22 includes a handlebar 36, a steering stem 38, a lock knob 40 and a steering housing 42. The steering stem 38 may be a telescoping shaft that includes an upper stem 44 connected to the handlebar 36 at one end and that is slidably received in a lower stem 46 (see FIG. 3) that is connected at a lower end to the steering housing 42. The lock knob 40 is used to connect the upper stem 44 to the lower stem 46 in a releasable manner so that the upper stem 44 can be moved relative to the lower stem 46 to lengthen and shorten the steering stem 38 as desired for the use of the conversion scooter 10 and size of the child on the conversion scooter 10. And, the front axle 34 is connected to the steering housing 42. Accordingly, to effectuate steering, rotation of the handlebar 38 by the user will result in rotation of the steering stem 38 which results in rotation of the steering housing 42, including the front axle 34 and the front wheels 32 rotatably supported at opposite ends of the front axle 34.

As illustrated in FIGS. 1-7, the conversion scooter 10 includes a sit-to-ride configuration. In one embodiment of the sit-to-ride configuration, the seat 24 is coupled to the forward portion 20 of the frame 12 and to the rear portion 16 of the frame. In an alternate embodiment, the seat 24 may include an outer shell 25 for aesthetic purposes. In the illustrated embodiment, the seat 24 includes a seating portion 48 with a raised end 50, and a riser portion 52. Additionally, the seat 24 has a first end 54 and a second end 56, and in one embodiment is generally L-shaped. The first end 54 is generally at the end of the seating portion 48 opposite the raised end 50, and the second end 56 is generally at the end of the riser portion 52 distal the raised end 50 of the seating portion 48 of the seat 24. In one embodiment the first end 54 of the seat 24 has a first coupling member 60 and the second end 56 of the seat 24 has a second coupling member 62. However, in a preferred embodiment, the first end 54 of the seat 24 has both a first coupling member 60 and a second coupling member 62. And, in a preferred embodiment, the second end 56 of the seat 24 similarly has both a first coupling member 60 and a second coupling member 62. In one embodiment the first coupling member 60 at the first end 54 is identical to the first coupling member 60 at the second end 56. Similarly, in one embodiment the second coupling member 62 at the first end 54 is identical to the second coupling member 62 at the second end 56.

Figure 6:
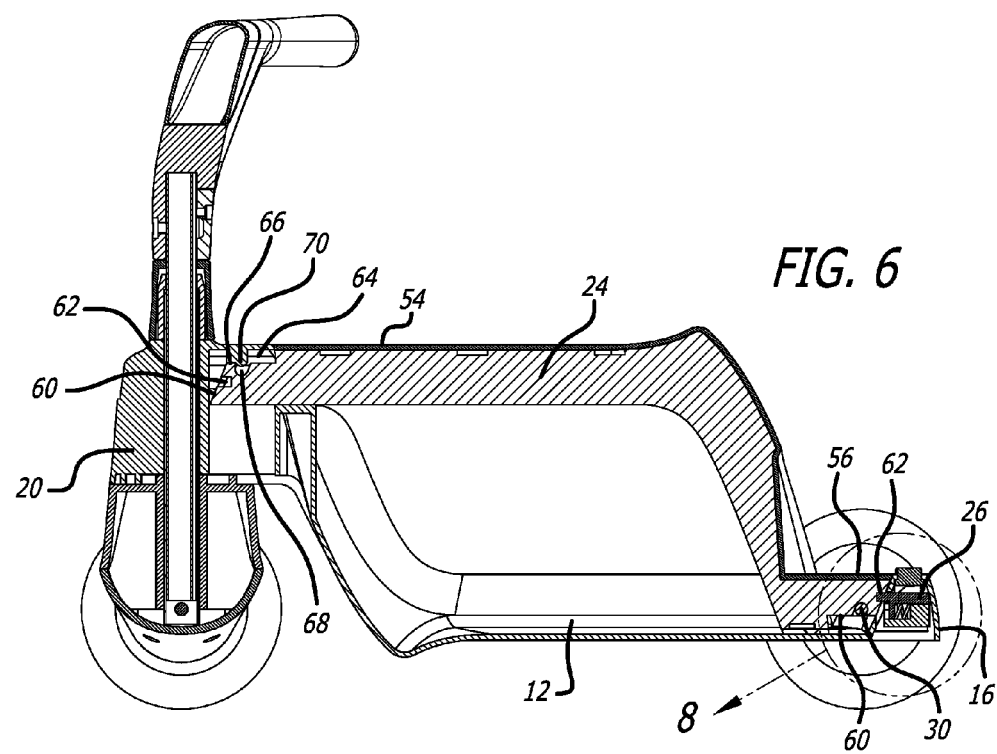
FIG. 6 is a cross-sectional view about a longitudinal axis of the conversion scooter of FIG. 1.

In a preferred embodiment, as shown in FIG. 6, the first coupling member 60 of the seat 24 in one embodiment is a protrusion 60 extending from the first end of the seat and the second end of the seat, respectively. In the sit-to-ride configuration of the scooter 10, one of the protrusions 60 is received in a mating receiver 64 in the forward portion 20 of the frame 12. In a preferred embodiment the receiver is a female receiver having a cavity. Additionally, in one embodiment as shown in FIG. 6, the receiver 64 has rib 70 extending from the receiver's inner surface, and the protrusion 60 has a groove 68 in its outer surface. The rib 70 is received and retained in the groove 68 in the protrusion 60 when the protrusion 60 is properly inserted into the receiver 64. Additionally, the receiver 64 has an undercut 66 adjacent the rib 70 to accommodate an end of the protrusion 60. Accordingly, in this embodiment the end of the protrusion 60 is held in place by the rib 70 of the receiver 64 in the groove 68. As explained above, it is understood that in one embodiment there are two first coupling members 60 on each seat 24. There is one first coupling member 60 at the first end 54 of the seat 24, and there is another first coupling member 60 at the second end 56 of the seat 24. This is best shown in the cross sectional view of FIG. 6.

As shown in FIGS. 6 and 8-11, the second coupling member 62 is an opening 62 in the seat 24. As explained above, however, it is understood that in one embodiment there are two second coupling members 62 on each seat 24. There is one second coupling member 62 at the first end 54 of the seat 24, and there is another second coupling member 62 at the second end 56 of the seat 24. This is best shown in the cross sectional view of FIG. 6. The second coupling member 62 of the second end 56 of the seat 24 is adapted to be engaged by the locking assembly 26 to lock the seat 24 in the sit-to-stand configuration of FIG. 1. Additionally, as explained below, the second coupling member 62 of the first end 54 of the seat 24 is adapted to be engaged by the locking assembly 26 to lock the seat 24 in the standing configuration of FIGS. 11-13.

Figure 4:
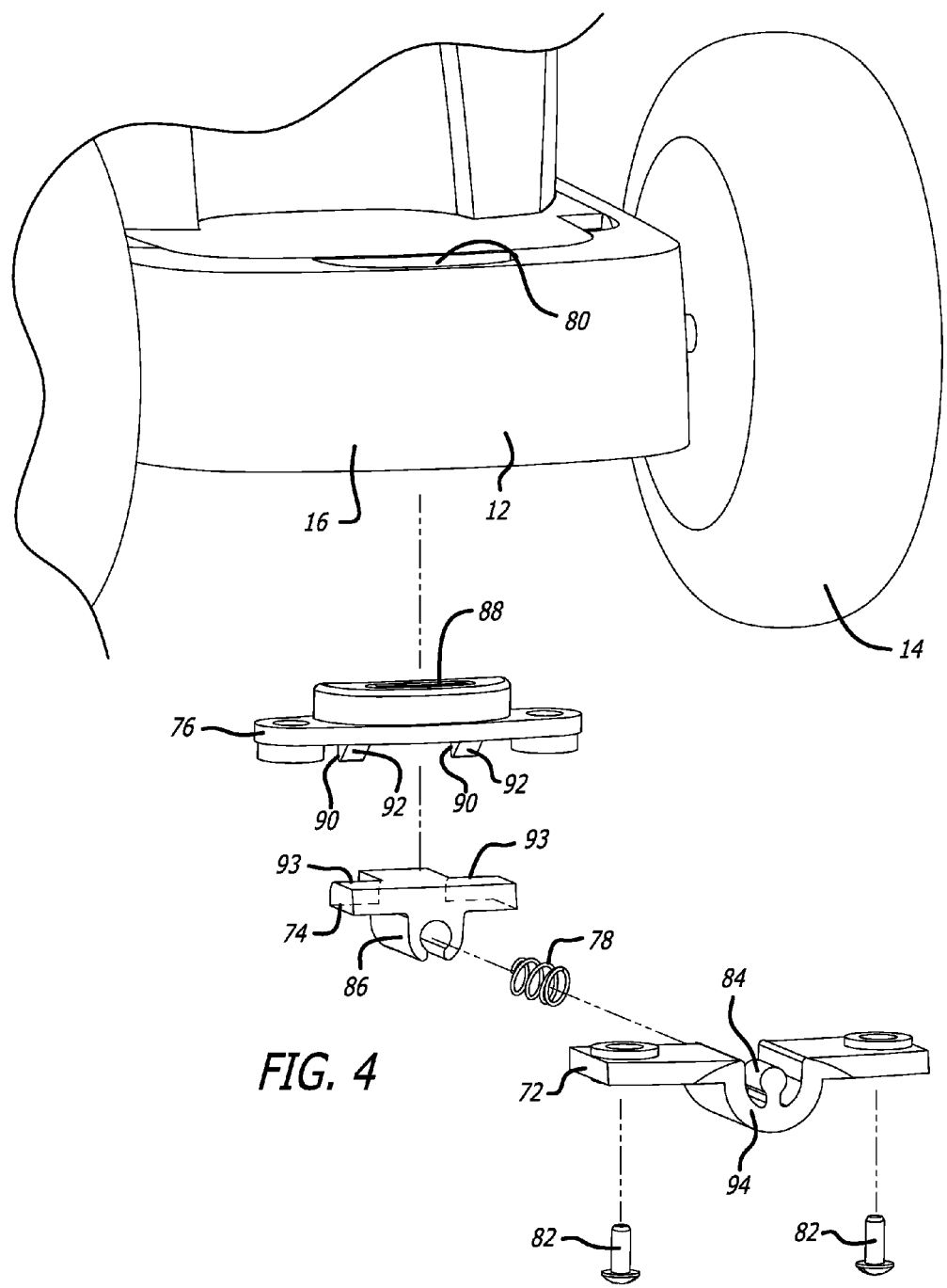
FIG. 4 is a partial exploded rear perspective view of a locking mechanism for the conversion scooter.
Figure 5:
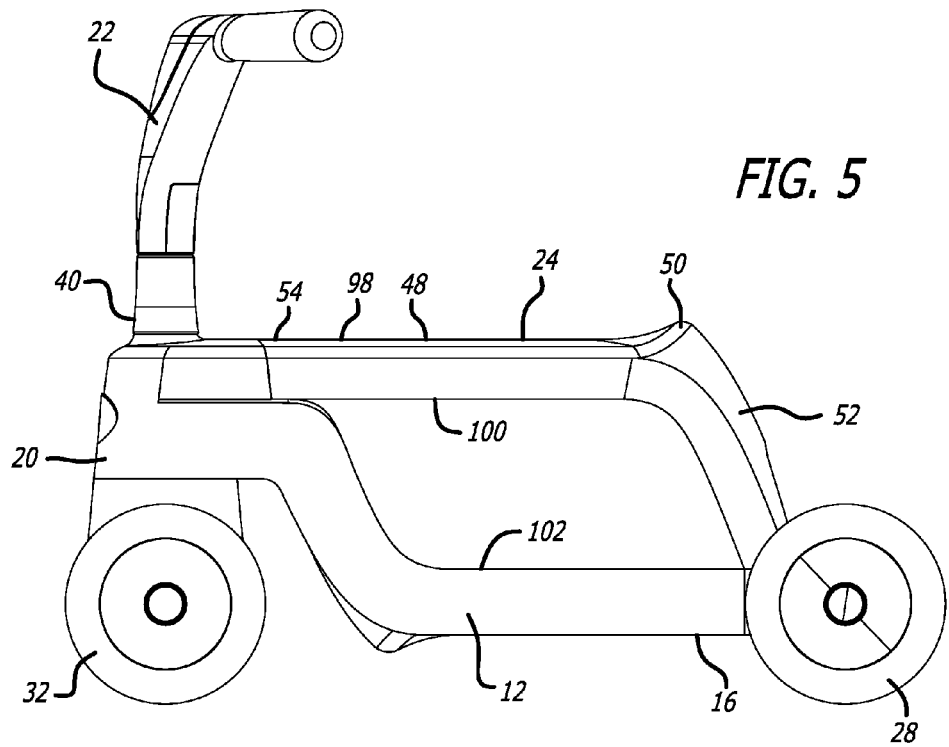
FIG. 5 is a side view of the conversion scooter of FIG. 1.

As shown in FIG. 4, in one embodiment the locking assembly 26 comprises a bracket 72, a slider 74 and a release member 76. In a preferred embodiment the release member 76 is a push button release member 76. In a preferred embodiment a spring 78 may also be provided to bias the slider 74 to the locked or extended position as shown in FIG. 8. The locking assembly 26 is connected to the frame 12 at the rear portion 16 of the frame 12. As shown in FIGS. 2 and 4, the locking assembly 26 is preferably connected to a lower or underneath portion of the frame 12, and the frame 12 has an opening 80 through which a portion of the button 76 extends. Fasteners 82 are used to secure the entire locking assembly 26 to the frame 12. The fasteners 82 also slidingly connect the button 76 to the bracket 72, with the slider 74 residing between the button member 76 and the bracket 72. In one embodiment, as best shown in FIG. 4, the bracket 72 has a rail 84 on which the slider 74 traverses. And, the slider 74 has fingers 86 that engage the rail 84 to slidingly secure the slider 74 to the bracket 72. As shown in FIGS. 8 and 9, the spring 78 is placed between the slider 74 and the bracket 72 to bias the slider 74 away from the bracket 72. The release member 76 has a button surface 88 on a top side, and a cam 90 on a bottom side. In a preferred embodiment the cam 90 comprises a plurality of ramps 92 as best shown in FIGS. 4, 8 and 9. As best shown in FIGS. 8 and 9, the cams 90 on the button member 76 engage a cam follower 93 on the slider 74.

In the normal position of the locking assembly 26 the slider 74 is in the extended or locked position as shown in FIG. 8 because the spring 78 biases the slider 74 away from the end 94 of the bracket 72. When the slider 74 is in the extended position an extension tab 96 of the slider 74 fits within the second coupling member 62 of the seat 24 to retain the seat 24 engaged to the frame 12. Next, when the button 88 is depressed, as shown in FIG. 9, the cams 90 extending from the button member 76 push against the cam follower 93 on the slider 74. As the button 88 is depressed it slides along the fasteners 82 and moves toward the bracket 72. The cams 90 push against the cam followers 93 to slide the slider 74 toward the end 94 of the bracket 72. In doing so the slider 74 slides on the rail 84 of the bracket 72 and compresses the spring 78. When the slider 74 moves sufficiently toward the end 94 of the bracket 72, the extension tab 96 of the slider 74 will be disengaged from the second coupling member 62 of the seat 24 and the seat 24 can then be removed from the frame 12. In a preferred embodiment, the push button release member moves in a first direction, and the slider moves in a second direction transverse to the first direction. The second direction is generally along a longitudinal axis of the scooter, and the first direction is generally perpendicular to the longitudinal axis of the scooter.

In the sit-to-ride configuration shown in FIG. 6, the first coupling member 60 at the first end 54 of the seat 24 engages the receiver 64 in the forward portion 20 of the frame 12, and the second coupling member 62 at the second end 56 of the seat 24 engages the locking assembly 26 at the rear portion 16 of the frame 12. And, the groove 68 in the protrusion 60 of the seat 24 will receive the rear axle 30 of the scooter 12 as shown in FIGS. 8 and 9.

As further illustrated in FIGS. 10-13, the conversion scooter 10 includes a standup or stand-to-ride configuration. In the sit-to-ride configuration of FIG. 10, the seat 24 has a seating surface 98 that a rider sits on and an underside scooter surface 100, and the frame 12 has an interior frame surface 102 beneath the seat 24. To position the conversion scooter 10 in the standup configuration, the seat 24 is removed, inverted and reinserted on the frame 12 as shown in FIGS. 10-11. In the standup configuration the second end 56 of the seat 24 is positioned at the forward portion 20 of the frame 12, and the first end 54 of the seat 24 is positioned at the rear portion 16 of the frame 12. Further, the seating surface 98 is positioned adjacent the interior frame surface 102 exposing the scooter surface 100 for standing on by a rider. In this position the riser portion 52 of the seat 24 resides against a front portion of the frame 12 instead of toward the rear portion 16 of the frame.

Figure 12:
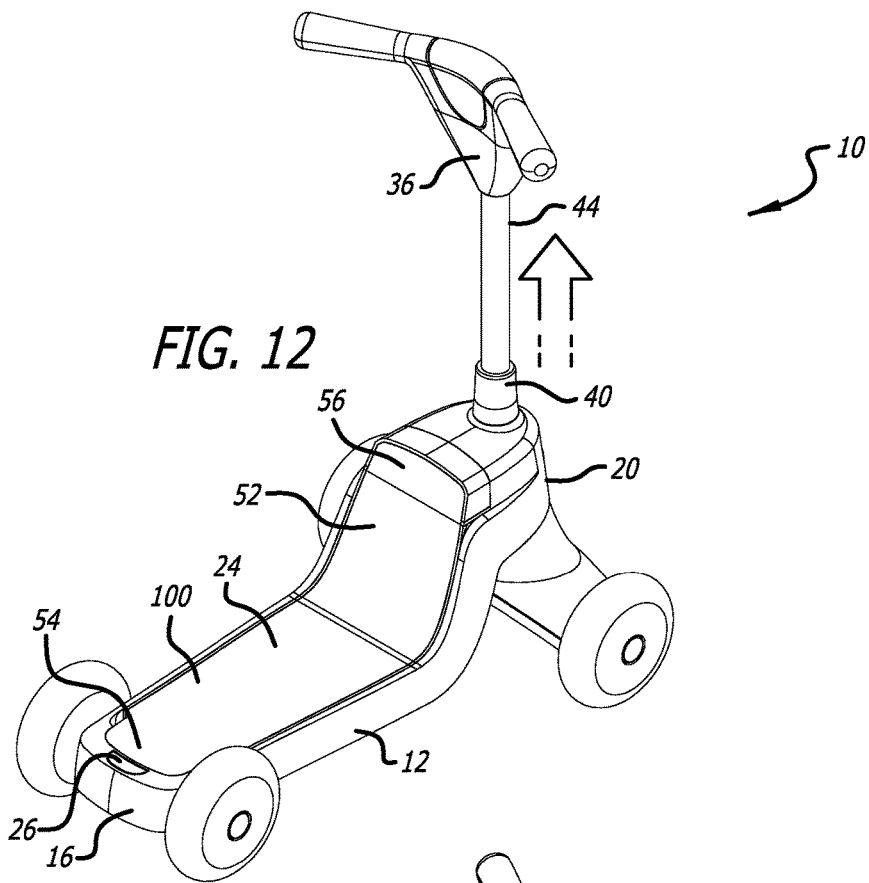
FIG. 12 is a rear perspective view of the conversion scooter in the stand orientation.
Figure 13:
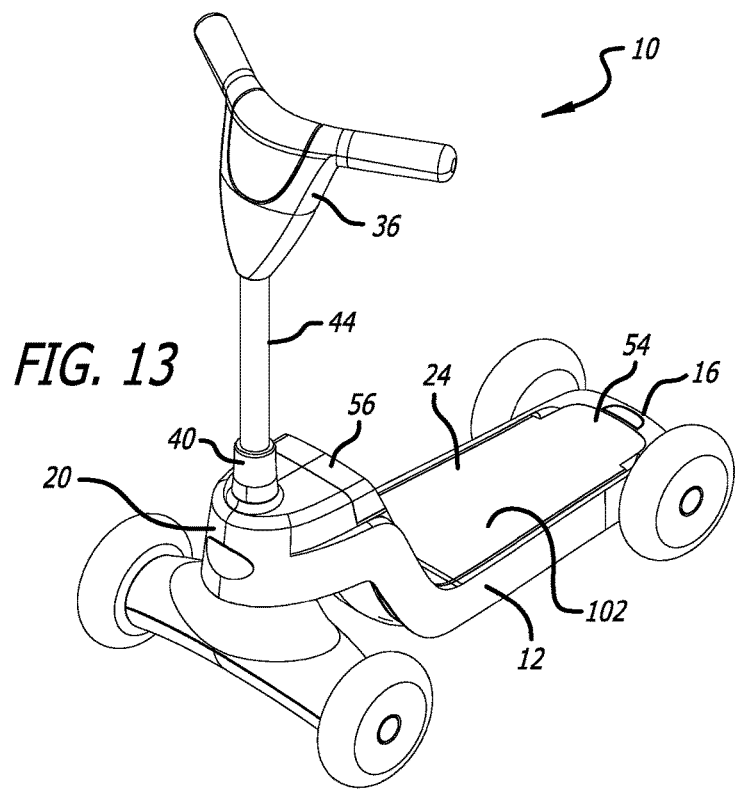
FIG. 13 is a front perspective view of the conversion scooter of FIG. 12.

As shown in FIGS. 11-13, in the standup configuration of the conversion scooter 10 the first coupling member 60 of the second end 56 of the seat 24 engages the receiver 64 in the forward portion 20 of the frame 12. In one embodiment the first coupling member 60 of the second end 56 is substantially similar to the first coupling member 60 of the first end 54 of the frame 12. Accordingly, a protrusion 60 of the first coupling member 60 at the second end 56 of the seat 24 engages the receiver 64 in the forward portion 20 of the frame 12. And, the end of the protrusion 60 is held in place against the undercut 66 in the receiver 64 by the rib 70 of the receiver 64.

Further, the second coupling member 62 of the first end 54 of the seat 24 is engaged by the locking assembly 26 to lock the seat 24 in the standup scooter configuration. Specifically, in one embodiment, the first end 54 of the seat 24 is positioned at the rear portion 16 of the frame 12 as shown in FIG. 11. The first end 54 is then pushed toward the frame 12 and contacts the locking assembly 26. The locking assembly 26 is biased so that the extension tab 96 of the slider is in the extended position. As the first end 54 is pushed toward the frame 12, the first end 54 pushes against the extension tab 96 of the locking assembly 26 and the seat 24 will force the extension tab 96 and slider 74 toward the end 94 of the bracket 72. When the seat 24, including the first end 54, is properly seated in the interior frame surface 102 of the frame 12, the second coupling member 62 will be adjacent the locking assembly 26, and the slider 74 will be pushed away from the end 94 of the bracket 72 and into engagement with the second coupling member 62, thereby locking the seat 24 in the standup configuration (see FIG. 12). And, the slot 68 in the protrusion 60 of the seat 24 will receive the rear axle 30 of the scooter 12, similar to the configuration shown in FIGS. 8 and 9.

To summarize, converting the conversion scooter 10 from a sit-to-ride configuration to a stand-to-ride configuration is accomplished by performing several steps. In one step, the seat 24 is initially removed from the sit-to-ride configuration of FIG. 6 by depressing the button 88 of the button member 76 as shown in FIG. 7. When the button 88 is depressed, the slider 74, which is biased in the locked position (see FIG. 8), will move to the unlocked position (see FIG. 9), and then the locking assembly 26 will be disengaged from the second coupling member 62 so that the second end 56 of the seat 24 can be lifted or removed from the rear portion 16 of the frame 12. At the same time, the first coupling member 60 of the first end 54 of the seat 24 can be removed from the mating receiver 64 at the front portion 20 of the frame 12. The seat 24 will be lifted from the frame 12 as shown in FIG. 10. The seat 24 is then flipped over and inverted as shown in FIG. 11. Next, the first coupling member 60 at the second end 56 of the seat 24 is placed into engagement with the mating receiver 64 in the forward portion 20 of the frame 12 as explained above with respect to the first coupling member 60 at the first end 54 of the seat 12. And, the second coupling member 62 at the first end 54 of the seat 24 is placed into engagement with the locking assembly 26 at the rear portion 16 of the frame 12 as shown in FIG. 11. Finally, the steering stem 38 of the scooter 10 may be extended as necessary by unlocking the lock knob 40, raising the upper stem 44 to the desired location and relocking the lock knob 40.

Conversely, converting the conversion scooter 10 from a stand-to-ride configuration of FIG. 12 to a sit-to-ride configuration is accomplished by performing several steps explained above essentially in the reverse order described above. In one step the button 88 on the locking assembly 26 is depressed to remove the slider 76 from the second coupling member 62 at the first end 54 of the seat 24 and the seat 24 is lifted up. The first coupling member 60 at the second end 56 of the seat 24 is then removed from the receiver 64 at the forward portion 54 of the frame 12 to fully remove the seat 24 from the frame 12. Finally, the steering assembly 22 is lowered in another step by twisting the lock knob 40 in a loosening direction, pushing down on the steering stem 38 and then twisting the lock knob 40 in the tightening direction until the steering assembly 22 is secured in the lowered sit-to-ride position.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. For example, the steps of converting from a sit to ride scooter to a stand to ride scooter, or from a stand to ride scooter to a sit to ride scooter, may be performed in any desirable order. In addition, certain steps may be altered or omitted. For example, the handlebar assembly 22 may be extended to any desirable position in either the sit to ride or the stand to ride scooter configurations, or the handlebar assembly 22 may be left in the same position when converting from one configuration to the other. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the disclosed embodiments may be embodied in other specific forms without departing from the spirit or central characteristics thereof. The present examples and embodiments, therefore, are to be considered in all respects as illustrative and not restrictive, and the disclosed embodiments are not to be limited to the details given herein. Accordingly, while the specific embodiments have been illustrated and described, numerous modifications come to mind without significantly departing from the spirit of the disclosure and the scope of protection is only limited by the scope of the accompanying Claims.

What is claimed is:

1. A conversion scooter that converts from a stand-up mode to a sit-down mode, comprising:
   a frame having a forward portion and a rear portion;
   a steering assembly connected to the frame at the forward portion of the frame;
   at least one front wheel connected to the steering assembly;
   a rear axle coupled to the rear portion of the frame;
   at least one rear wheel coupled to the rear axle;
   a seat having an L-shape, the seat having a first end and a second end, a first coupling member at the first end of the seat and the second end of the seat, a second coupling member at the first end of the seat and the second end of the seat, wherein the first coupling member comprises a protrusion extending from the first end of the seat, wherein the second coupling member comprises an aperture in seat;
   a female receiver at the forward portion of the frame, the female receiver having a rib extending from an interior of the receiver to removably receive a groove in a portion of the protrusion of the first coupling member; and,
   a locking assembly at the rear portion of the frame, the locking assembly comprising a push-button release member having a cam, a slider member having a tab that releasably engages the second coupling member of the seat, the slider member further having a cam follower that is selectively engaged by the cam on the push-button release member, and a bracket that slidingly receives the sliding member.

2. The conversion scooter of claim 1, wherein the receiver has an undercut adjacent the rib to accommodate an end of the protrusion.

3. The conversion scooter of claim 1, wherein the seat has a groove in the protrusion at the second end, and wherein the groove receives the rear axle.

4. The conversion scooter of claim 1, further comprising a spring between the bracket and the slider member to bias the slider away from the bracket.

5. The conversion scooter of claim 1, wherein the push-button release member moves in a first direction, and wherein the slider member moves in a second direction transverse to the first direction.

6. The conversion scooter of claim 1, wherein in the sit-down mode the second end of the seat is locked to the frame with the locking assembly engaging the second end of the seat, and wherein in the stand-up mode the first end of the seat is locked to the frame with the locking assembly engaging the first end of the seat.

7. A conversion scooter that converts from a stand-up mode to a sit-down mode, comprising:
   a frame having a forward portion and a rear portion;
   a steering assembly connected to the frame at the forward portion of the frame;
   at least one front wheel connected to the steering assembly;
   a rear axle coupled to the rear portion of the frame;
   at least one rear wheel coupled to the rear axle;
   a seat having an L-shape, the seat having a first end and a second end, a first coupling member at the first end of the seat, a second coupling member at the first end of the seat, wherein the first coupling member comprises a protrusion extending from the first end of the seat, wherein the second coupling member comprises an aperture in seat;
   a female receiver at the forward portion of the frame, the female receiver having a rib to removably engage the first coupling member; and,
   a locking assembly at the rear portion of the frame, the locking assembly comprising a release member having a cam, a slider member having a tab that releasably engages the second coupling member of the seat, and the slider member further having a cam follower that is selectively engaged by the cam on a push-button release member.

8. The conversion scooter of claim 7, further comprising a cavity in a longitudinal portion of the frame to receive a portion of the seat when the conversion scooter is in the stand-up mode, the portion of the seat in the cavity being used to stand on by the user.

9. The conversion scooter of claim 7, wherein the locking assembly further comprises a bracket that slidingly receives the sliding member, and a spring to bias the sliding member away from the bracket.

10. The conversion scooter of claim 7, wherein the seat has a groove in the protrusion extending from the first end to receive the rib extending from an interior of the receiver.

11. The conversion scooter of claim 7, wherein the seat has a groove in the protrusion extending from the second end, and wherein the groove receives the rear axle.

12. A conversion scooter that converts from a stand-up mode to a sit-down mode, comprising:
   a frame having a forward portion and a rear portion;
   a steering assembly connected to the frame at the forward portion of the frame;
   at least one front wheel connected to the steering assembly;
   at least one rear wheel operatively coupled to the rear portion of the frame;
   a seat having a first end and a second end, a first coupling member at the first end of the seat and the second end of the seat, a second coupling member at the first end of the seat and the second end of the seat;
   a receiver at the forward portion of the frame, the receiver adapted to secure the first coupling member of the seat to the forward portion of the frame; and,
   a locking assembly at the rear portion of the frame, the locking assembly having a release member extending from the frame, and having a slider member having a tab that releasably engages the second coupling member of the seat to secure the seat to the frame.

13. The conversion scooter of claim 12, wherein the first coupling member comprises a protrusion extending from the seat, and wherein the second coupling member comprises an aperture in seat.

14. The conversion scooter of claim 13, wherein the receiver is a female receiver having a cavity and a rib extending into the cavity to removably engage the first coupling member.

15. The conversion scooter of claim 12, wherein the locking assembly further comprises a bracket that slidingly receives the sliding member, and a spring between the bracket and the slider member to bias the slider away from the bracket, wherein the release member is a push-button release member, wherein the push-button release member moves in a first direction, and wherein the slider member moves in a second direction transverse to the first direction.

16. The conversion scooter of claim 12, wherein the release member has a cam extending therefrom, and wherein the slider member has a cam follower that is selectively engaged by the cam on the release member.

17. The conversion scooter of claim 12, wherein in the sit-down mode the second end of the seat is locked to the frame with the locking assembly engaging the second end of the seat, and wherein in the stand-up mode the first end of the seat is locked to the frame with the locking assembly engaging the first end of the seat.

18. The conversion scooter of claim 12, wherein the conversion scooter is configured to be converted between the sit-down mode and the stand-up mode without requiring the addition or subtraction of any parts.

* * * * *